US006430210B1

United States Patent
McGrath et al.

(10) Patent No.: US 6,430,210 B1
(45) Date of Patent: Aug. 6, 2002

(54) RECEIVER FOR DETECTING AN AMPLITUDE MODULATED SIGNAL INSINUATED ON AN GHM SIGNAL

(75) Inventors: Donald Thomas McGrath, Clifton Park; Kenneth Brakeley Welles, II, Scotia; John Erik Hershey, Ballston Lake, all of NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/285,664

(22) Filed: Apr. 5, 1999

(51) Int. Cl.$^7$ .............................. A61F 2/06; H04L 27/30
(52) U.S. Cl. ........................................ 375/130; 375/316
(58) Field of Search ................................ 375/130, 131, 375/132, 136, 138, 140, 147, 259, 316–340; 340/310.01, 310.02, 310.03

(56) References Cited

U.S. PATENT DOCUMENTS

| | | | |
|---|---|---|---|
| 4,875,221 A | | 10/1989 | Mori |
| 5,519,725 A | * | 5/1996 | Hershey et al. ............. 375/216 |
| 5,563,906 A | | 10/1996 | Hershey et al. |
| 5,568,507 A | | 10/1996 | Hershey et al. |
| 5,844,949 A | | 12/1998 | Hershey et al. |

OTHER PUBLICATIONS

"Modest But Useful Erasure Technique For DPSK," JE Hershey; RT Hoctor; AA Hassan; Electronic Letters, vol. 33, No. 1, Jan. 2, 1997, pp. 21–22.

* cited by examiner

Primary Examiner—Stephen Chin
Assistant Examiner—Lenny Jiang
(74) Attorney, Agent, or Firm—Jill M. Breedlove; Christian G. Cabou

(57) ABSTRACT

A receiver for enabling one-way communications in a GHM network which does not interfere with or reduce the capability of the GHM network. The receiver detects a small modulation factor signal present on the GHM signal normally transmitted by the GHM transmitter. If the frequency of the modulated signal corresponds to a pre-defined frequency, then the receiver generates a command signal to, for example, a relay, annunciator, or other external device. More particularly, and in one embodiment, the receiver includes a filter which partially isolates the GHM energy from the lower 60 Hz harmonics. The receiver also includes a envelope detector coupled to filter. The envelope detector is coupled to a frequency detector. The frequency detector is coupled to a command decoder. The command decoder determines whether a plurality of AM modulation frequencies are present on the received signal. If the AM modulation signal is a specified frequency the decoder generates a signal which, in turn, causes signal generator to generate a command signal for transmission to an external device.

11 Claims, 3 Drawing Sheets

RECEIVER FOR DETECTING AN AMPLITUDE MODULATED SIGNAL INSINUATED ON AN GHM SIGNAL

CROSS REFERENCE TO RELATED APPLICATIONS

This application is related in subject matter to U.S. patent application Ser. No. 09/132,080, filed Aug. 10, 1998 entitled, "Automatic Meter Reading System Using Locally Communicating Utility Meters," which is assigned to the assignee of this application.

BACKGROUND OF THE INVENTION

This invention relates generally to a power line communication system and more particularly, to a power line communication system for communicating commands and data on a power line.

Electric power supply companies typically have a service person visit customer sites to read an electricity meter at the site to determine the amount of energy consumed for billing purposes. This can be cumbersome and time consuming, particularly when there are many customer sites over a large geographic area.

Many utility meter based systems have been proposed which utilize automated meter reading (AMR) operations. Some systems involve, for example, power line or radio communications. Other systems are hybrids, i.e., involve both power line and radio communications. Typically, data and commands can be transmitted between a central station and the utility meters. Such communication systems enable utilities to easily and quickly obtain energy consumption measurements at many different sites.

Geometric Harmonic Modulation (GHM) signals for transmission on the power line is particularly well suited for AMR applications since GHM signals can be transmitted through power line components, such as distribution transformers. GHM is described, for example, in Hershey et al., U.S. Pat. No. 5,844,949, which is assigned to the present assignee, and is herein incorporated by reference. Generally, GHM allocates signaling energy into lobes, or tones, or different frequencies evenly spaced. The GHM signaling waveforms are true spread spectrum signals in that the signal bandwidth, i.e., the bandwidth from the lowest frequency tone to the highest, exceeds the information bandwidth conveyed by the GHM transmission.

In addition to performing meter reading functions, it is desirable to provide additional functions such as residential utility load shedding. For example, it would be desirable to provide an inexpensive, controllable breaker that utilizes a GHM based extended area AMR system, wherein additional information is communicated over the GHM signal.

BRIEF SUMMARY OF THE INVENTION

These and other objects may be attained by a receiver which can be added to an existing network for enabling one-way, GHM based communications, which do not interfere or reduce the capability of, or limit the normal functions of, the GHM network. More specifically, the receiver detects a small modulation factor signal present on the GHM signal normally transmitted by the GHM transmitter. If the frequency of the modulated signal corresponds to a pre-defined frequency, then the receiver generates a command signal to an external device, such as a relay.

More particularly, in one embodiment, the receiver includes a filter which partially isolates the GHM energy (normally in the 5–10 KHz range) from the lower 60 Hz harmonics. The receiver also includes a envelope detector coupled to the filter. The detector may, for example, be a square wave detector. The envelope detector is coupled to a frequency detector and the frequency detector is coupled to a command decoder. The decoder determines whether at least one amplitude modulated frequency is present on the received signal. If the signal has a known modulation frequency, then the decoder generate a signal which causes a signal generator to generate a command signal for transmission to the external device.

DETAILED DESCRIPTION OF THE INVENTION

Generally, the present invention is directed to a low cost GHM receiver which can be incorporated in existing power delivery networks to facilitate functions such as load shedding. Load shedding refers, for example, to temporarily removing loads from the network to reduce energy consumption during peak energy consumption times. The present receiver may be used in connection with many different networks and types of transmitters.

The load shedding function in a power delivery network does not require two-way communications. For example, a command can be transmitted from a master station to a breaker which removes the load from the network. The load levels can be monitored at the master station to determine whether additional load shedding commands need to be transmitted. As such, the breaker status need not be communicated back to the master station as in a two-way communications network.

Figure 1:
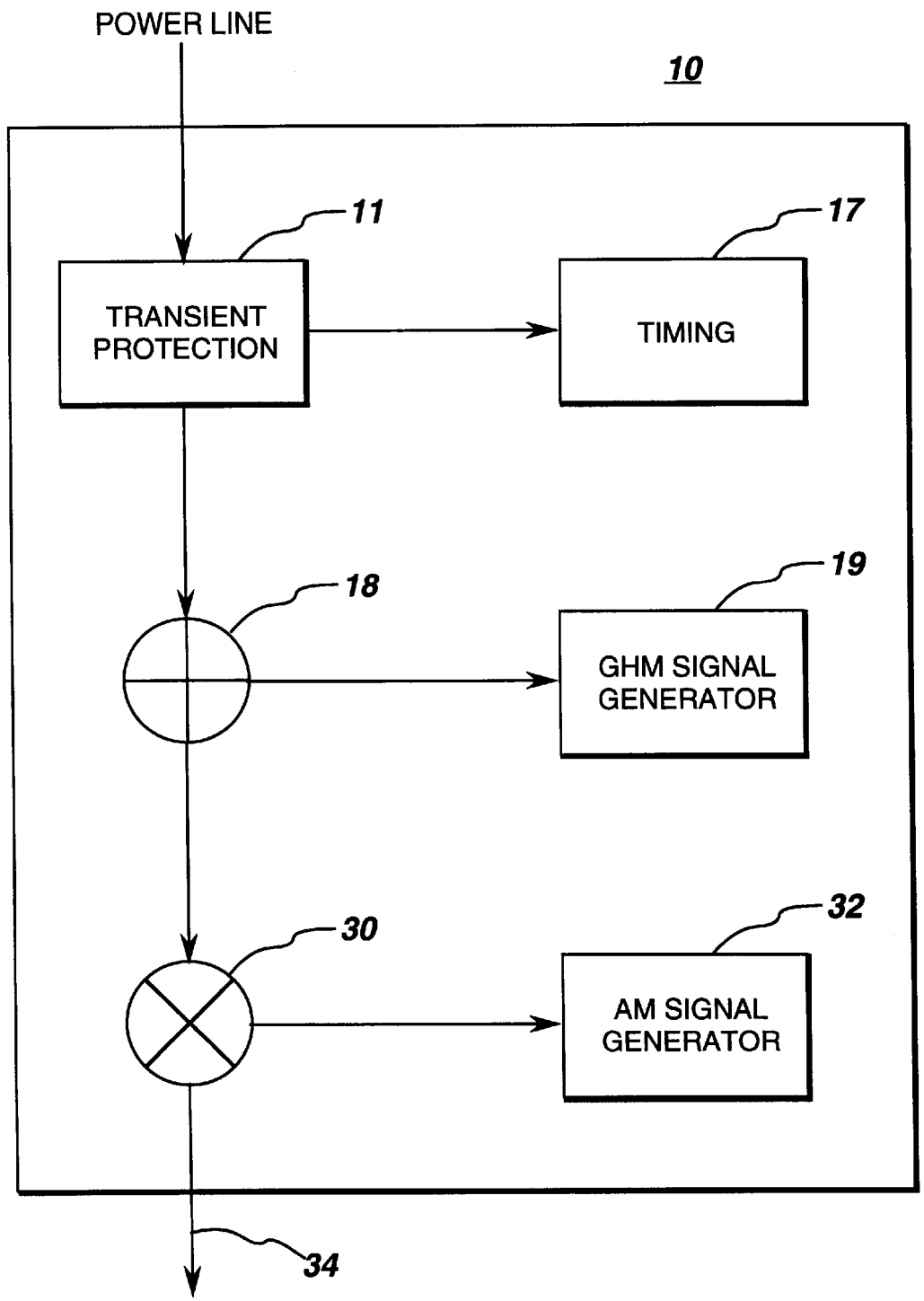
FIG. 1 is a simplified block diagram of a typical GHM based transmitter.

FIG. 1 illustrates an exemplary embodiment of a transmitter which may be used in connection with GHM communications. More particularly, FIG. 1 is a simplified block diagram of a transmitter 10 coupled to a power line and represents one of many transmitters which may be coupled to the power line. A transient protection device 11, coupled to the power line, limits power surges to protect equipment coupled to the power line. Transient protection device 11 couples the power line voltage to a timing controller 17, which, in turn, determines master timing information from the fundamental power line frequency. GHM signal generator 19 generates the GHM signal that is superimposed on the power line signal by an adder 18. Both GHM signal generator 19 and Timing 17 are known in the art, and, as such, are not the subject of this invention. An amplitude modulated signal is insinuated on the GHM signal and is further superimposed on the power line signal by the use of a amplitude modulated signal generator 32 and a multiplier 30. The resulting signal at power line 34 is a GHM modulated signal having an amplitude modulated signal insinuated thereon, also referred to as am AM-GHM signal in this specification.

Figure 2:
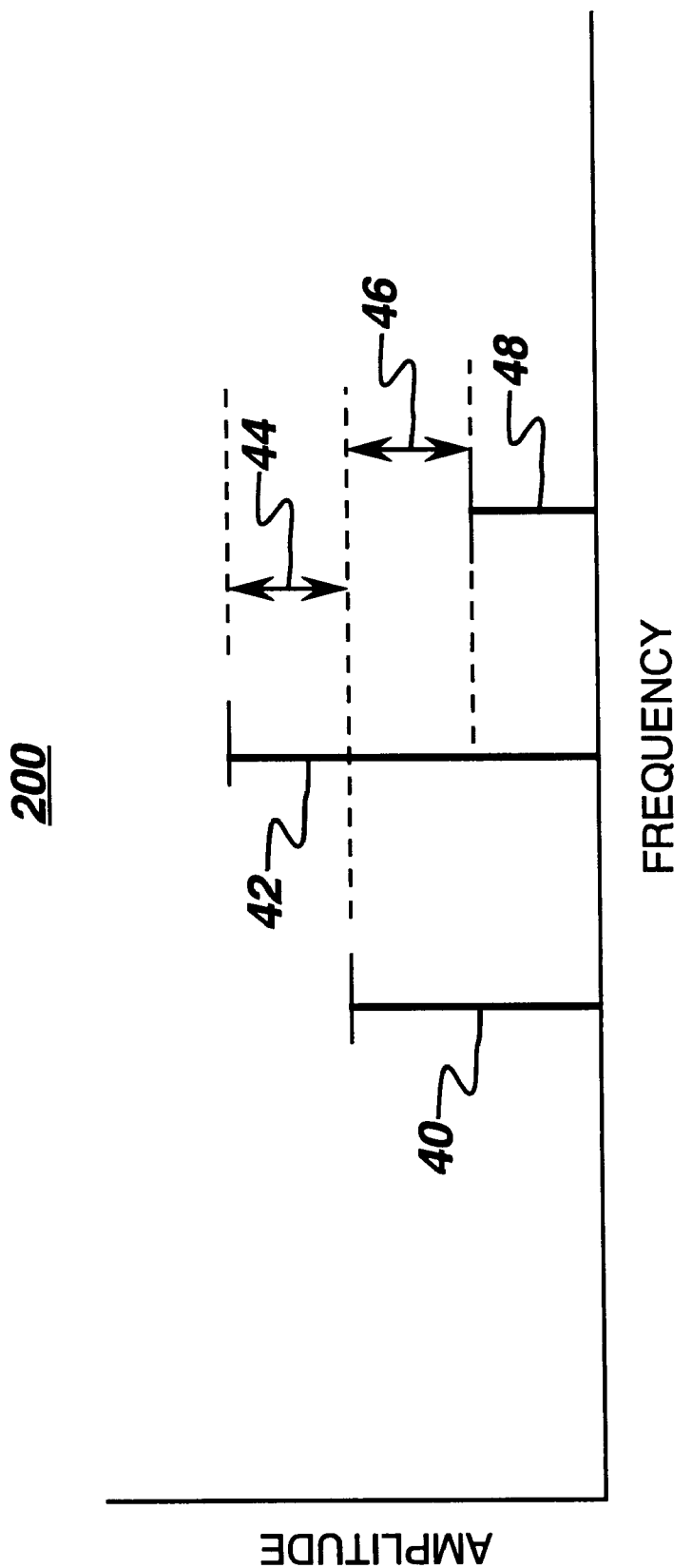
FIG. 2 is a representative amplitude modulated GHM signal.

In one example, the AM-GHM signal described above may have a waveform 200, as illustrated in FIG. 2. Although the typical GHM signal, generally, has 8 carriers, waveform 200 shows only 3 carries for illustrative purposes only. The first carrier is identified as signal 40, the second carrier is identified as carrier 42, and the third carrier is identified as signal 48. The amplitude of each respective carrier may not be equal to the amplitude of each respective other carrier signal, as illustrated by a first difference 44 and a second difference 46. The rate of change of the difference in amplitude of each signal corresponds to the change in amplitude of the amplitude modulated signal insinuated on the respective carrier signal. Consequently, information is transmitted via the AM-GHM signal by detecting the amplitude modulated signal, and correspondingly by measuring the range of change of the amplitude of each respective carrier signal, utilizing an GHM based receiver to be described next.

Figure 3:
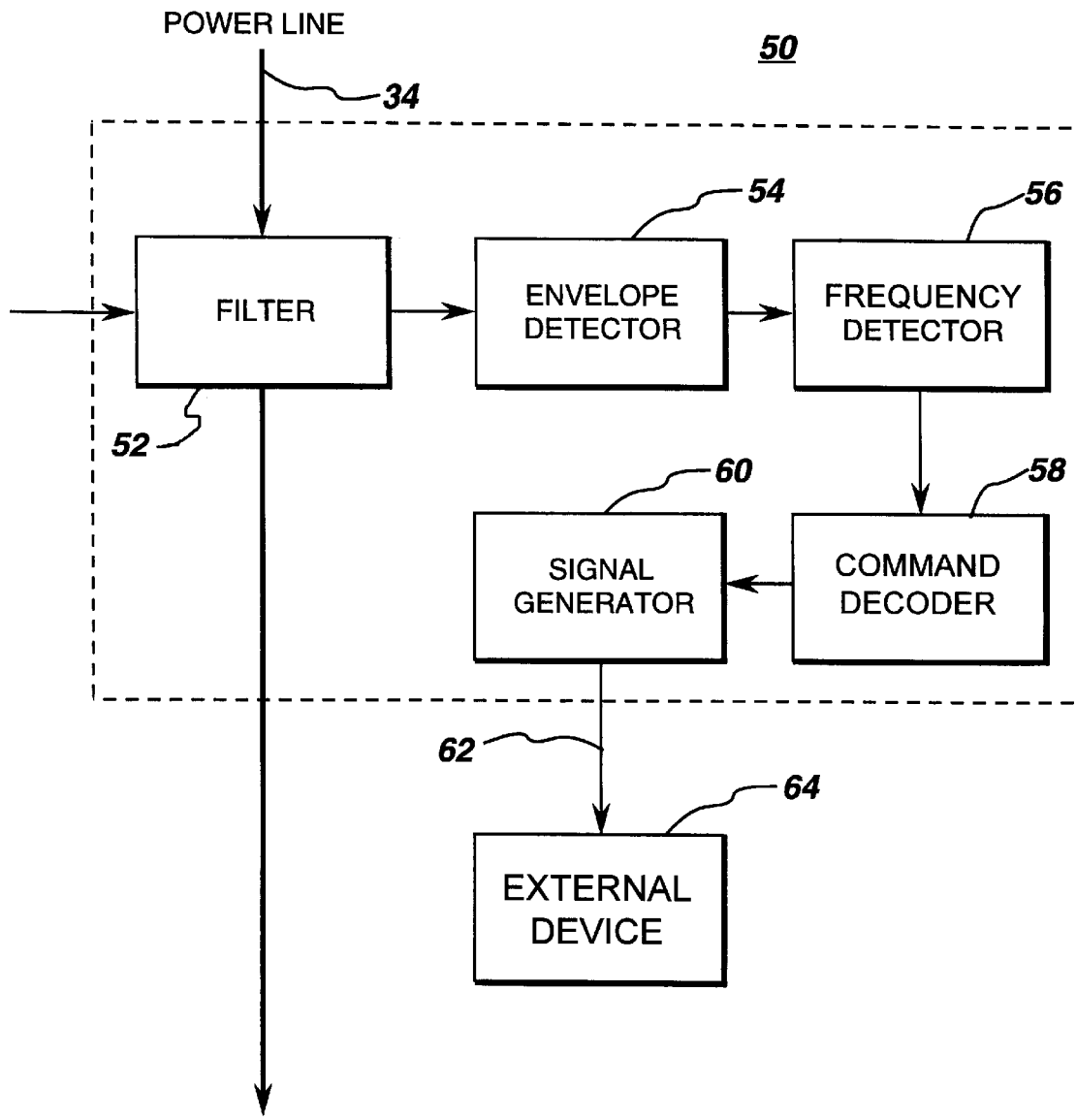
FIG. 3 is a schematic block diagram of a signaling receiver and decoder in accordance with one embodiment of the present invention.

FIG. 3 illustrates a receiver 50 in accordance with one embodiment of the present invention. Receiver 50 may be utilized in connection with a residential meter. Receiver 50 is coupled to a power line 34 so as to receive commands transmitted from the master station (not shown) via the power line. Receiver 50 may be included into an existing network for enabling one-way communications on the GHM network, which do not interfere or reduce the capability of, or limit the normal functions of the GHM network.

Receiver 50 is configured to detect the amplitude modulated signal, also called a modulation factor signal, present on the GHM signal normally transmitted by, for example, transmitter 10. Particularly, receiver 50 comprises a filter 52, which partially isolates the GHM energy (normally in the 5–10 KHz range) from the lower 60 Hz harmonics, typically present on the power line signal. The filter may, for example, be a 5 KHz bandpass filter. Alternatively, filter 52 may be a more sophisticated comb filter having its narrow pass band windows centered on the un-modulated GHM frequency components or carrier signals. Generally, with such filters, integration time is traded-off with false alarm rate. That is, a longer integration time results in a lower false alarm rate. Preferably, however, the integration time is short. For a load shedding application as described above, it may be preferred to utilize a filter with a longer integration time to reduce the false alarm rate. For example, the integration time may typically be about ten seconds.

Receiver also includes a envelope detector 54 which is coupled to filter 52. Detector 54 may, for example, be a square wave detector. Detector 54 is also coupled to a frequency detector 56, such as at least one tuned filter, a Fast Fourier Transform (FFT) analyzer, or a digital signal processor (DSP) adapted to identify a plurality of frequencies. The signal generated by low pass filter 56 is coupled to a command decoder 58, which determines whether a limited number of AM modulation frequencies are present. The signal generated by decoder 58 is coupled to a signal generator 60 for generating at least one command signal on command signal line 62 for transmission to a controlled relay, annunciator, or other external device 64. In on exemplary embodiment, the command signal is a current signal of about 1 amp adapted to drive a load shed relay.

In operation, transmitter 10 insinuates an amplitude modulation (AM) signal with a modulation factor on the master GHM signal which is transmitted on the power line. In one exemplary embodiment the modulation factor is about 0.5. The frequency of the AM signal conveys the message, e.g., open or close a relay associated with a load. The AM signal may have a frequency in a range from about 0.25 Hertz to about 3.0 Hertz.

Receiver 50 detects the small modulation factor signal present on the GHM signal. Particularly, filter 52 partially isolates the GHM energy (normally in the 5 KHz to 10 KHz range) from the lower 60 Hz harmonics. Envelope detector 54 receives the signal from filter 52, and generates an AM signal which is subsequently coupled to frequency detector 56. Frequency detector 56 generates at least one low frequency signal, wherein each signal is coupled to command decoder 58. Decoder 58 determines whether any of the low frequency signals generated by detector 56 is a frequency which matches a preselected AM modulation frequency corresponding to a specified command. If a match is found, then decoder 58 generates at least one drive signal which is coupled to signal generator 60. In turn signal generator 60 generates at least one command signal corresponding to the respective detected AM modulation frequency for transmission to external device 64.

For example, if the AM modulation frequency corresponding to a command to open a relay is 0.75 Hz, and if such a frequency is detected by command decoder 58, then decoder 58 generates a signal which causes generator 60 to generate a command signal to open the relay. Similarly, if the AM modulation frequency corresponding to a command to close the relay is 1.75 Hz, and if such a frequency is detected by command decoder 58, then decoder 58 generates a drive signal that causes generator 60 to generate a command signal to close the relay.

The above described receiver is low in cost and can be utilized in connection with one-way communications in a GHM based communications network. In addition to power utility related functions, the receiver could be coupled, for example, to an early warning system for floods and tornadoes.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A GHM based power line receiver coupled to a power line, the power line also adapted to be coupled to a GHM transmitter, which transmitter is adapted to generate a GHM signal having an amplitude modulated signal insinuated thereon, said GHM receiver comprising:

a filter coupled to the power line for detecting the amplitude modulated signal insinuated on the GHM signal;

an envelope detector coupled to said filter for detecting the envelope of the amplitude modulated signal passed by said filter;

a frequency detector coupled to said envelope detector for detecting the frequency of the envelope of the amplitude modulated signal generated by said envelope detector; and a decoder coupled to said frequency detector for generating a respective drive signal corresponding with a respective frequency of the envelope of the amplitude modulated signal.

2. A receiver in accordance with claim 1, wherein said filter comprises a bandpass filter.

3. A receiver in accordance with claim 1, wherein said filter comprises a comb filter having narrow pass band windows centered on un-modulated frequency components of the GHM signal.

4. A receiver in accordance with claim 1, wherein said envelope detector comprises a square-wave detector.

5. A receiver in accordance with claim 1, wherein the amplitude modulated frequency is in a range from about 0.25 Hertz to about 3.0 Hertz.

6. A receiver in accordance with claim 1, wherein said frequency detector includes a detector selected from the group including at least one tuned filter, a Fast Fourier Transform (FFT) analyzer, or a digital signal processor.

7. A receiver in accordance with claim 1 further comprising a signal generator coupled to said decoder, wherein said signal generator is configured to generate a respective command signal in correspondence with said respective drive signal.

8. A GHM based power line receiver coupled to a power line, the power line also adapted to be coupled to a GHM transmitter, which transmitter is adapted to generate a GHM signal having an amplitude modulated signal insinuated thereon, said GHM receiver comprising:

means for filtering the power line so as to detect the amplitude modulated signal insinuated on the GHM signal;

means for detecting the envelope of the amplitude modulated signal insinuated on the GHM signal;

means for detecting the frequency of the envelope of the amplitude modulated signal insinuated on the GHM signal; and means for generating a respective drive signal in correspondence with a respective amplitude modulated envelope frequency.

9. The GHM receiver as recited in claim 8, further comprising means for generating a respective command signal for driving a respective external device, in correspondence with said respective drive signal.

10. A method of detecting a amplitude modulated signal insinuated on a GHM signal superimposed on a power line signal, said method comprising the following steps:

filtering the power line signal so as to detect the amplitude modulated signal insinuated on the GHM signal;

detecting the envelope of the amplitude modulated signal;

detecting the frequency of the envelope of the amplitude modulated signal; and generating a respective drive signal corresponding with a respective envelope frequency of the amplitude modulated signal.

11. The method as recited in claim 10, further comprising the step of generating a respective command signal for driving a respective external device, wherein said respective drive signal corresponds with said respective frequency drive signal.

* * * * *